United States Patent [19]

Woiceshyn

[11] Patent Number: 4,879,163

[45] Date of Patent: Nov. 7, 1989

[54] TEXTILES CONTAINING INTERSTICES AND PROCESSES FOR MAKING SUCH TEXTILES

[75] Inventor: D. Mark Woiceshyn, St. Catharines, Canada

[73] Assignee: Bay Mills Limited, St. Catharines, Canada

[21] Appl. No.: 100,455

[22] Filed: Sep. 24, 1987

[51] Int. Cl.$^4$ ............................................. B32B 27/14
[52] U.S. Cl. .................................. 428/198; 156/155; 156/272.2; 156/275.7; 156/276; 428/95; 428/372
[58] Field of Search ..................... 428/95, 198, 372; 156/155, 272.2, 275.7, 276

[56] References Cited

U.S. PATENT DOCUMENTS 4,324,453  4/1982  Patel .................................... 428/372

Primary Examiner—Marion C. McCamish
Attorney, Agent, or Firm—Fitzpatrick, Cella, Harper & Scinto

[57] ABSTRACT

A textile having increased porosity is made by introducing resin and microspheres or other agents for creating interstices between filaments within a yarn. The microspheres upon heating or other agents push the filaments apart and create interstices in the yarn and bending stresses in the filaments. The resin may then be cured, holding the filaments in spaced apart relationship relative to each other and maintaining the bending stresses in the filaments.

23 Claims, No Drawings

TEXTILES CONTAINING INTERSTICES AND PROCESSES FOR MAKING SUCH TEXTILES

BACKGROUND OF THE INVENTION

1. Field of the Invention This invention relates to new, porous forms of textiles and includes processes for making such textiles. These new textiles may be used for reinforcing roofinq membranes, carpets, tarpaulins and other purposes. The products of this invention can have increased absorptive properties and individual yarn porosity. The products of this invention further can have good flexibility and provide easier processing on less complicated manufacturing equipment. For example, the use of the product of this invention in the manufacture of roofing membranes is less likely to lead to wrinkles, creases or other structural defects than products made from the same yarn but without the resin and interstices of this invention.

2. Description Of The Prior Art

Reinforcing composites for bitumenous roofing membranes, such as described in commonly assigned U.S. Pat. Nos. 4,491,617 and 4,539,254, have been made using combinations of scrims and light weight non woven mats. The scrims provide strength and the lightweight non-woven mats provide for ease of saturation of the bitumen. The art also uses heavy polyester mats (for example, 170 grams per square yard or more) without any reinforcing scrim. These heavy mats, however, are needle punched to provide porosity for saturation. Not only do such heavy mats require a great deal of polyester per square yard, but they do not have as great tear resistance or ease of saturation as is desired. Attempts to use weft-inserted warp-knit polyester scrims (6×6 yarns per inch or 9×9 yarns per inch of 1000 denier continuous filament polyester) without any mat have provided excellent strength, elongation, tear resistance, and heat stability in roofing membranes of bitumen but have been unacceptable due to low stiffness, poor adhesion to the bitumen and excessively thin gauge (for example, 9·mils, 230 microns).

In the field of carpets, primary backings commonly made of jute receive tufts of carpet yarn which are held by mechanical forces and friction (i.e. mechanical adhesion) and extend from one side of the primary backing. This combination is then attached to the top of a resilient backing such as latex foam. Various synthetic, non-woven primary backings have also been used instead of jute. Attempts to use polyester fabrics of 6×6 or 9×9 yarns per inch of 1000 denier yarn in primary backings without any mat have been unsuccessful because they have given neither sufficient coverage nor sufficient mechanical adhesion to hold carpet tufts.

SUMMARY OF THE PRESENT INVENTION

Textiles of the present invention may be made by dispersing a mechanical blowing agent, such as heat-expandable microspheres, in a thermosetting or thermoplastic adhesive resin and dispersing that resin/microsphere dispersion between filaments within a yarn which comprises a plurality of filaments. In this process of the invention, heat is then applied to the process yarn/microsphere/resin combination and causes the microspheres to expand and push adjacent filaments apart, creating interstices or pores within the yarn and bending stresses within the filaments. The heat may also cause the resin to set after the filaments have been separated, thereby holding the filaments in their spaced apart relationship relative to each other and maintaining them under bending stress.

The process of the present invention generally includes selecting a yarn made of filaments and dispersing a resin and interstices between filaments within the yarn, thereby separating filaments of the yarn, and setting the resin while filaments are separated, thereby holding filaments in spaced apart relationship relative to each other. Additional variations of the process of this invention are described later in this specification.

Interstices in the present invention result from filaments, which would naturally tend to lie side-by side, being separated from each other and held in that spaced apart relationship relative to each other by elements of the resin. Those elements of resin extend between filaments at least at places within the yarn where the filaments come together or cross over each other. The resin elements adhere to the filaments and maintain the bending stresses created within the filaments by the interstices. Even if the filaments possess some crimp or bulk before introduction of the resin and the interstices of this invention, the processes of the present invention introduce additional separation and bending stress into the filaments beyond those they would have in their relaxed state, and the resin adheres to the filaments and preserves the spaced apart relationship and bending stresses in filaments, overcoming the natural tendency of the filaments to return to a more relaxed, straighter position with fewer or no interstices.

The resin and any agent for creating interstices within the yarn may be dispersed within the yarn by bringing the resin and agent into contact with the yarn and by proper selection of the viscosity of the resin, agent, or any resin dispersion, the tension on the yarns, the amount of twist in the yarns, the wettability of the yarn by the resin or the agent for creating interstices, the speed of processing, and any other conditions of application that can be adjusted to obtain the desired degree and efficiency of penetration and dispersion between filaments within the yarn. Specific methods for such dispersing of resin and agents for creating interstices within yarn are set forth later in this specification.

The textile of this invention comprises yarn that includes a plurality of filaments held in spaced apart relationship relative to each other and maintained under bending stress by resin elements extending between and adherinq to at least two of such filaments. These textiles, whether woven, knit, or non woven, or consisting only of yarn, comprise yarn made from filaments, a resin dispersed within such yarn, and interstices dispersed within the yarn. The interstices separate adjacent filaments of the·yarn, and the resin holds filaments of the yarn under bending stress in their separated positions. (As used herein, "interstice" means a minute interior space or pore surrounded substantially or completely by a rigid or semi-rigid matrix comprising resin or resin and filaments; interstice as used herein does not refer to spaces which occur solely because filaments are entangled or laid side-by-side loosely, in which case crimps or stiffness in the filaments may create non rigid, collapsible, interior openings.) The resin adheres to yarn filaments and, because of the bending stresses in the filaments and the rigidity of the resin, holds such filaments apart from each other and defines the interstices.

In the present invention, the pores in the yarn cause it to have a diameter greater than the original diameter of the yarn and resin alone. The yarn is preferably about twice its original diameter, though lesser amounts may be desirable in some end uses. More preferable in some uses is expansion to at least about four times the original diameter.

The process of this invention and the textiles made from it have several advantages over the prior art, including the following. The increased porosity makes the yarn more absorptive of materials such as a bitumen. Increased coverage, thickness and stiffness may be obtained at less cost for yarn because the textiles have increased thickness and yarn porosity. The textiles are also more manageable, resisting tendencies to wrinkle and crease. Abrading the surface of these thickened textiles loosens surface filaments without sacrificing tensile strength to the same extent as would occur in a fabric without the interstices of this invention. The loosening of surface filaments has many advantages, such as allowing increased modified bitumen asphalt penetration, which is advantageous for use in reinforcing roofing membranes, and increased mechanical adhesion, which is advantageous for use in carpet backings.

The textiles of the present invention also permit use of a structure having lower yarn density. For example, when a polyester weft-inserted warp-knit scrim having 9×9 yarns per inch of 1000 denier each is used in forming a textile according to the present invention, the product has thickness and coverage comparable to a conventional scrim having 20×20 yarns per inch of 1000 denier each. As another example, in reinforcements for roofing membranes the present invention may be used without a mat. Such mats are employed with conventional scrims in prior art roofinq membranes and carpet backings, but such mats are not necessary with the present invention because its expanded scrim provides sufficient bulk, porosity and coverage.

If fabric products of this invention are made using a thermoplastic resin which has a properly selected high glass transition temperature, the product can be calendered or otherwise subjected to pressure and heat (for example, passed through a heated nip created between two pressure rolls) at sufficiently high temperatures to soften the resin and reduce the fabric in thickness. This may totally or significantly fill the window pane openings between the yarns of an open weave net-like fabric, which is advantageous for example in making reinforcements for tarpaulins.

Kevlar, polyethylene, cotton, polypropylene, carbon, polyester or glass fiber, or any other kind of fiber, may be used. For reinforcing roofing membranes the textile is preferably a non woven scrim such as a weft-inserted warp knit fabric or other knit fabric, though it may also be woven. We prefer that the polyester yarns range from 500 denier (555 dtex) to 1000 denier (1111 dtex); yarns with denier from 40 to 2000 (44 to 2222 dtex) or higher may also be used.

In a preferred embodiment of the present invention, the textile is made of a continuous filament yarn having a low twist, e.g., five or fewer turns per inch, and more preferably three or fewer turns per inch for fiberglass, and one or less for polyester. A yarn of low twist, particularly if processed under low tension, permits efficient penetration and dispersion within the yarn of a resin and an agent such as microspheres for creating interstices. Preferably the filaments, whether continuous or not, are substantially straight. That is to say, the filaments do not initially possess significant permanent crimps or bends.

Thermoplastic resins as used herein are sufficiently rigid, though they may be somewhat flexible, at temperatures at which the textile is ultimately used to hold filaments in their separated positions, i.e., or restore them to those positions when deformed. It will also be understood that some resins cross link, cure or otherwise react or dry to become rigid, semi rigid, or rubbery at one temperature and may melt or soften and become plastic at higher temperatures. With some thermosetting resins it is desirable to provide a further cure after the initial setting, for example by heat treatment at temperatures of about 170° C. Thermosetting resins which are preferred in the present invention for use in roofing membranes include stiff styrene butadiene rubber, urea formaldehyde and acrylic latex. Water resistant acrylic latex resin sold for use in roofing membranes is a most preferred resin. Other thermosetting resins, such as water based resins capable of cross-linking to give a thermoset structure, may also be made by adding thermosetting resins to thermoplastic resins.

Various agents may be added to the resins, including the following examples. An emulsion thickener may be added to increase the viscosity of the resin. Wetting agents, such as surfactants, may be added to improve the efficiency of penetration of the resin between the filaments of the yarn. Flurocarbon compounds may be added to reduce water wicking in the final product.

In making reinforcements for roofing membranes, resins such as acrylic resins with a glass transition temperature, "Tg", of +20 to +35° C. are preferred; more preferred are resins with Tg's of 24° to 30° C.; and most preferred, about 27° C. For carpet, resins with Tg's of −15° to +20° C. are preferred; more preferred, 0° to 12° C.; and most preferred, about 6° to 7° C. For tarpaulins, sign fabrics, and other fabrics with similar uses, resins with Tg's of 7° to 21° C. are preferred; more preferred, 10° to 18° C.; and most preferred, about 14° C.

In a preferred embodiment, a textile is penetrated with an amount of resin equal in dry weight to 10 to 45% of the weight of the yarn alone. This measure is known as percent dry pickup (% DPU). DPU percentages may range in some preferred embodiments from 5 to 150%. If lower amounts of resin are used in the range of about 10 to 20% DPU, observation has shown that the resin by natural forces such as surface tension will locate itself within the yarn primarily at filament cross over points and points where the filaments are close to each other. It will thus be understood that the interstices of this invention need not be totally surrounded by resin but may be defined or constituted by openings inside the yarn caused by resin at filament cross over points and points where filaments come close together. Such resin holds the filaments in their spaced apart relationship and preserves the interstices within the yarn.

If higher amounts of resin are used, in the range of about 50% or more DPU, the resin is located not only where filaments cross over or come close to each other but may also substantially enclose a large proportion of the interstices; when such a yarn is expanded, it will not be as porous as the yarn referred to above with its DPU of 10 to 20%.

In the present invention, interstices may be created and yarn filaments separated in any appropriate way. In a preferred embodiment, the yarn filaments are separated by incorporating a mechanical blowing agent into a thermosetting resin. Especially preferred as a mechanical blowing agent in this embodiment of the present invention are microspheres of resinous polyvinylidene chloride (PVDC). Microspheres are hollow spheres of very small diameter which contain a blowing agent such as liquid isobutane. Upon heating, the PVDC sphere softens and the liquid inside vaporizes and exerts pressure on the walls of the microsphere, which expands. When such microspheres are dispersed in resin between filaments, this expansion causes filaments to separate and yarn to become porous. The resin binder, for example a latex binder, is then cured, holding filaments apart and creating bulkier, stiffer yarn and fabric. Remnants of PVDC microsphere shells may remain entrapped in the yarn. Such microspheres may for example have an initial diameter of 5 to 17 microns and reach diameters of 10 to 60 microns after expansion. The degree of expansion may depend on the amount of heating. For example, in some cases the microspheres near the surface of the yarn receive more heat and expand more than those in the interior. Preparation of microspheres is described in U.S. Pat. No. 3,615,972. PVDC microspheres are available commercially from the Pierce & Stevens Corp., Buffalo, N.Y., under the trade name Miralite.

Microspheres or other agents causing or creating interstices may be dispersed in the resin and the yarn in any convenient method. They may be mixed into a thermosetting resin, preferably for microspheres in a range between 1 and 50 parts (by weight) to 100 parts (by weight) of the resin, and more preferably 2 to 30 parts per 100. The scrim is dipped into the microsphere-containing resin. The resin penetrates and disperses between filaments or strands within the yarn to a significant extent, carrying microspheres between filaments of the yarns. Applying a temperature from about 90° C. to a maximum of about 140° C. causes the polymeric shell of the microsphere to soften and the hydrocarbons in the microspheres to vaporize, expanding the microspheres, separating filaments, and creating interstices between the yarn filaments. The resin then sets, holding the yarn filaments apart with interstices in between filaments.

It is also contemplated that microspheres may be dispersed in the yarn before the resin is dispersed within the yarn. For example, yarn, preferably already in the form of a fabric, may be led through a fluidized bed of microspheres and some microspheres will penetrate the yarn in between filaments. Excess microspheres may be removed, resin dispersed within the yarn, and the composite of yarn, microspheres and resin then heated, resulting in a textile comprising yarn made of filaments, resin between such filaments, and interstices dispersed within such yarn, thereby separating such filaments. Alternatively, the microspheres may be dispersed in the yarn, heated and expanded before the resin is dispersed within the yarn. As a further alternative, microspheres may be dispersed within the resin by first dispersing them in water. The scrim may then be dipped in the dispersion and dried. Thereafter the yarn is dipped in a thermosetting resin which disperses within the yarn, and the combination is heated to a temperature of from about 90° C. to a maximum of about 140° C., causing the microspheres between the filaments to expand and the resin to set.

In place of a mechanical blowing agent, a chemical blowing agent can be used to separate the filaments and thereby create interstices within the yarn. The chemical blowing agent may be incorporated into the resin and scrim in manners similar to those described above for incorporating mechanical blowing agents. In another embodiment of the present invention, a yarn with resin incorporated in it may be subjected to microwave energy, causing the resin to foam. The foamed resin being dispersed within the yarn to a significant extent, the filaments are thereby separated. The resin is then set, holding the yarn filaments apart.

It is also a part of the present invention to make an intermediate textile product in which the temperature applied is sufficient to partially set the resin while allowing the microspheres or other agent for creating interstices to remain substantially unexpanded. The resulting intermediate textile product may be stored, sold or woven in unexpanded form. Applying higher temperatures during later processing will cause the microspheres to expand and the resin to set fully, resulting in the development of the intermediate product into a thick and porous textile. Properly selected thermoplastic resins may also be used in this variation of the invention.

In a preferred embodiment of the present invention, a cross-linking agent is added to the thermosetting resin, preferably a modified melamine formaldehyde resin, in a range between 5 and 10 parts (by weight) to 100 parts (by weight) of the resin. One preferred cross linking agent is Cymel 303 cross linking agent sold by American Cyanamid Company, Wayne, N.J. The following examples illustrate the invention.

EXAMPLE 1

A solution consisting of 100 parts by weight acrylic latex (having a glass transition temperature, "Tg", of +27° C.) at 47% solids by weight, 70 parts by weight water, 2.5 parts by weight alkali soluble acrylic emulsion thickener (viscosity of thickener, 1200 centipoise), and 5 parts by weight expandable PVDC microspheres, brand name Expancel 551 DE, was applied at 100% wet pickup to a 9×9 yarns/inch, 1000 denier high tenacity polyester weft-inserted warp knit fabric stitched together with 70 denier textured polyester yarn and heat stabilized as described in U.S. application Ser. No. 871,508, filed June 6, 1986. Upon drying over steam cans at 150° C., the wet fabric was heated up past the softening point of the microspheres (Tg, +65° C.) and the isobutane vapor exerted pressure against the polymeric shell. The force expanded the shell, which subsequently pushed the polyester filaments of each yarn apart. The matrix formed of polyester filaments, acrylic latex and microspheres became a set structure and further heating of the fabric to cure the binder did not alter the structure even though the polymeric shell of the microspheres may have melted or collapsed. Each yarn was expanded in all directions and the following properties were obtained: the porosity of each individual yarn was increased since the filaments were separated and held apart; the openings in the fabric were decreased due to the larger sized yarns and the smaller windows between the yarns; the fabric was thicker and stiffer.

All of these properties are important in the production of a polyester reinforced roofing membrane because asphalt can saturate each yarn; the flow of the asphalt through the fabric is somewhat facilitated due to the increased porosity of the individual yarns; and the stiffer and thicker product improves the appearance, stiffness and ease of applying the roofing membrane.

EXAMPLE 2

The fabric in Example 1 was penetrated with a heat sealable PVC latex comprised of 100 parts latex (Tg, +14° C.) at 49% solids, 40 parts water, 2.5 parts acrylic thickener (viscosity of thickener, 2000 centipoise) and 7 parts expandable microspheres of the kind used in Example 1. Upon drying and curing the fabric was calendered a surface temperature of about 180° C. and sufficient pressure on the calendering rolls to decrease the fabric thickness from 25 to 30 mils (625 to 750 microns) before calendering to a reduced greige thickness from 9 mils to under 7 mils (225 to under 175 microns) in thickness, and the windows between the filaments disappeared due to the spreading out of the filaments. The increased coverage and very flat profile improved the properties of a reinforced tarpaulin covering fabric while still providing high strength and tear resistance. This fabric would also provide an improved reinforced sign fabric where coverage and flatness is very desirable.

EXAMPLE 3

The fabric in Example 1 was penetrated with an acrylic latex binder comprised of 100 parts acrylic latex (Tg, +6° C.) at 48% total solids, 40 parts water, 2.5 parts thickener (viscosity of thickener, 1500 cp) and 5 parts expandable microspheres of the kind used in Example 1. The greater fabric coverage obtained from the spreading of the filaments upon drying and curing of the acrylic latex allowed this fabric to be used as a primary backing fabric for tufted carpets. This 9×9 backing can be used in place of 20×20 polypropylene woven primary backings due to the greater fabric coverage and the higher temperature resistance of polyester as compared to polypropylene.

I claim:

1. A process for making a textile comprising the steps of:
   selecting a yarn comprising a plurality of filaments;
   dispersing unexpanded microspheres and a resin within such yarn;
   causing interstices to be dispersed in said yarn by expanding said microspheres, thereby placing filaments of the yarn in spaced apart relationship relative to each other; and
   setting such resin while filaments are so separated, thereby holding filaments in spaced apart relationship to each other.

2. The process of claim 1 which includes the step of creating yarn that is at least about twice the diameter of the yarn and resin without interstices.

3. The process of claim 1 which includes the step of creating yarn that is at least about four times the diameter of the yarn and resin without interstices.

4. A process according to claim 1 further including the step of creating a weft-inserted warp-knit scrim fabric from the yarn.

5. A process according to claim 1 wherein the dispersing step includes the step of dispersing said unexpanded microspheres in said resin and then dispersing said resin within the yarn.

6. A process according to claim 1, wherein said dispersing step includes the steps of placing said yarn in a dispersion of said unexpanded microspheres in water, drying the yarn, and thereafter applying said resin to the yarn.

7. A process according to claim 1, further including as a method of causing interstices to be dispersed within the yarn, the step of subjecting resin within the yarn to microwave energy and thereby creating a foamed resin.

8. A process according to claim 1 wherein the dispersing step includes the step of dispersing said unexpanded microspheres within such resin.

9. The product produced by the process of claim 1 wherein said product is a reinforcing material for roofing membranes.

10. The product produced by the process of claim 1 wherein said product is a primary carpet backing.

11. The process of claim 8, wherein said dispersing step comprises the steps of dispersing said unexpanded microspheres within the yarn by means of a fluidized bed, and then applying a resin to the yarn after said microspheres have been expanded.

12. The process of claim 1, including the additional step of calendering the yarn after causing interstices to be dispersed within it, thereby spreading out the filaments of the yarn and flattening the yarn.

13. The product produced by the process of claim 1.

14. Yarn comprising a plurality of filaments (a) held in spaced apart relationship relative to each other by resin elements extending between and adhering to at least two of such filaments and (b) maintained under bending stress by such resin elements, said yarn including remnants of expanded microspheres.

15. The yarn of claim 14 in which the filaments are substantially straight and lie substantially parallel to the axis of the yarn.

16. The yarn of claim 14 in which the yarn is at least about twice the diameter of the yarn and resin without interstices.

17. The yarn of claim 14 in which the yarn is at least about four times the diameter of the yarn and resin without interstices.

18. A yarn according to claim 14 wherein such resin is a thermosetting resin.

19. A textile comprising yarn made of filaments, resin dispersed within such yarn, and interstices dispersed within such yarn, such interstices separating filaments of the yarn and such resin holding filaments of the yarn in their separated positions, said interstices including remnants of expanded microspheres.

20. A textile according to claim 19 in which the yarn is polyester yarn in the form of weft-inserted warp-knit scrim.

21. An intermediate textile product comprising yarn made of filaments, resin dispersed within such yarn, and unexpanded microspheres for creating interstices dispersed within such yarn.

22. A composite for reinforcing roofing membranes comprising continuous filament yarn in the form of scrim, resin dispersed within such yarn, and interstices dispersed within such yarn, such interstices separating filaments of the yarn from each other and such resin holding filaments of the yarn in their separated positions, said interstices including remnants of expanded microspheres, whereby the composite is flexible, is capable of being impregnated by a bituminous material and has sufficient strength and stiffness to be useful as a reinforcing roofing membrane.

23. A primary carpet backing comprising continuous filament yarn in the form of scrim, resin dispersed within such yarn, and interstices dispersed within such yarn, such interstices separating filaments of the yarn from each other and such resin holding filaments of the yarn in their separated positions, such interstices including remnants of expanded microspheres, whereby the primary carpet backing has sufficient bulk to allow for mechanical adhesion in tufting and sufficient thickness and stiffness to be useful as primary carpet backing.

* * * * *